Oct. 4, 1960
L. FREEMAN
2,954,937
SHREDDING MACHINES
Filed April 26, 1957
2 Sheets-Sheet 1
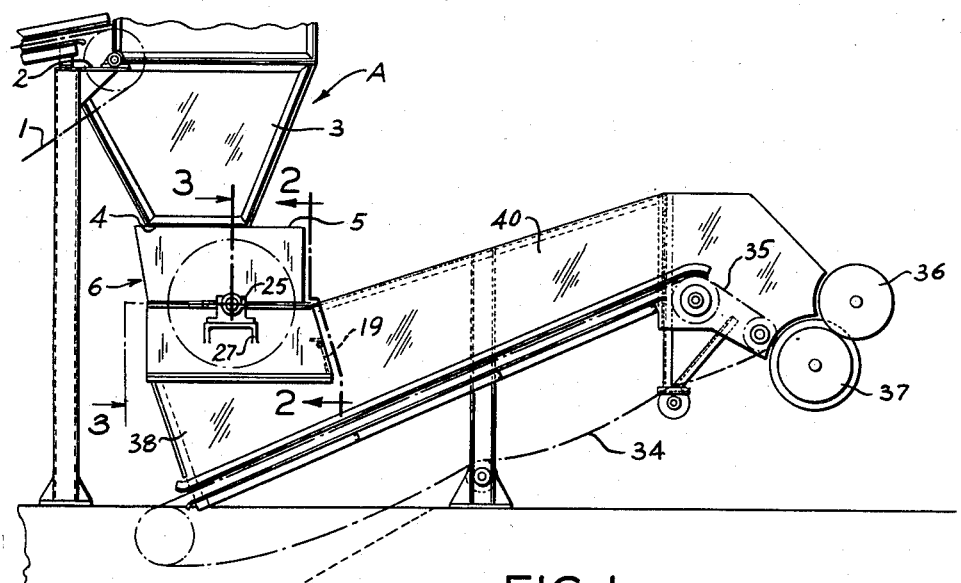
FIG. 1.
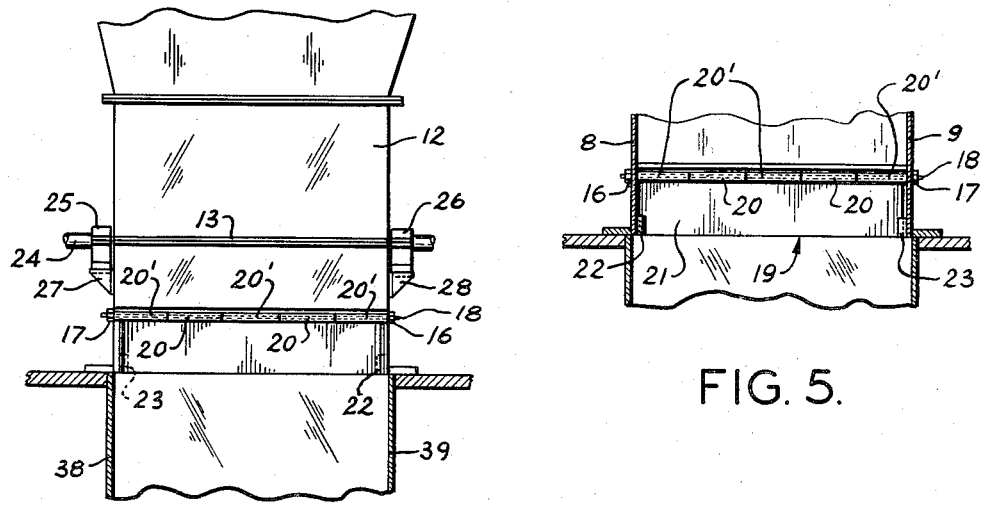
FIG. 2.
FIG. 5.
INVENTOR
LEO FREEMAN
BY *Alfred W Petschaft*
ATTORNEY Oct. 4, 1960 — L. FREEMAN — 2,954,937
SHREDDING MACHINES
Filed April 26, 1957 — 2 Sheets-Sheet 2

INVENTOR
LEO FREEMAN
BY Alfred W Petchaft
ATTORNEY 2,954,937
Patented Oct. 4, 1960

2,954,937
SHREDDING MACHINES

Leo Freeman, Baton Rouge, La., assignor to Gruendler Crusher and Pulverizer Company, St. Louis, Mo., a corporation of Missouri Filed Apr. 26, 1957, Ser. No. 655,278

2 Claims. (Cl. 241—186)

This invention relates to new and useful improvements in shredding machines and, more particularly, to machines uniquely adapted for shredding sugar cane and similar materials preparatory to expressing juices therefrom.

In the processing of sugar cane stalks it has become a conventional procedure to feed the stalks through a machine which shreds the stalks into a plurality of discrete fibrous pieces which are then passed through crushing rolls which express the raw sugar juice therefrom. The shredder and crusher are usually operated in tandem as components of a raw sugar plant in which the stalks are first fed into the shredder and the shredded stalks are then discharged onto a conveyor which, in turn, delivers them to the crushing rolls. The shredder is usually loaded through a feed conveyor and hopper and every effort is made to maintain a reasonably constant feed rate. However, sugar cane harvesting and the delivery of the cane to the mill is basically an agricultural process and very often the rate of delivery of cane to the mill fluctuates, with the result that, for intermittent periods, the feed rate of cane through the shredder will become excessive. Since the speed of the discharge conveyor is constant, the crushed material piles up on the conveyor faster than it can be carried away. Consequently, the shredded cane tends to back up into, and clog, the shredder, resulting in a costly shut-down.

It is, therefore, a primary object of the present invention to provide a shredding machine which will not readily become clogged as a result of intermittent excessive increases in feed rate.

It is also an object of the present invention to provide a shredding machine of the type stated which provides efficient and trouble-free operation.

It is an additional object of the present invention to provide a shredding machine which, when incorporated in a raw sugar plant, will reduce the amount of shut-down time of the plant.

With the above and other objects in view, my invention resides in the novel features of form, construction, arrangement, and combination of parts presently described and pointed out in the claims.

In the accompanying drawings—

Fig. 1 is a side elevational view of a shredding and crushing plant incorporating a shredder constructed in accordance with and embodying the present invention;

Figs. 2 and 3 are fragmentary sectional views taken along lines 2—2 and 3—3, respectively, of Fig. 1;

Fig. 5 is a fragmentary sectional view taken along line 5—5 of Fig. 4.

Figure 3:
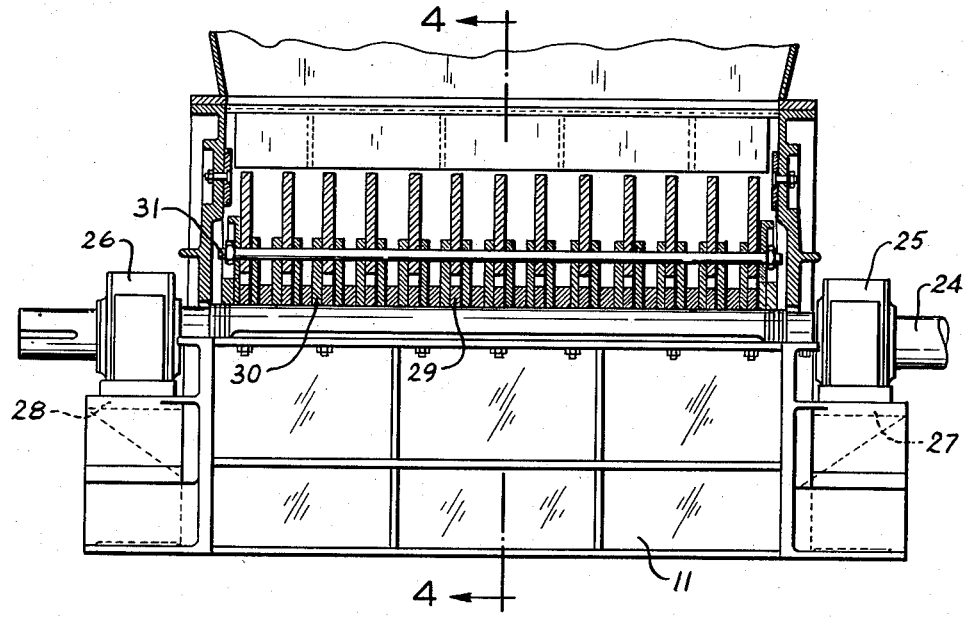
Figure 4:
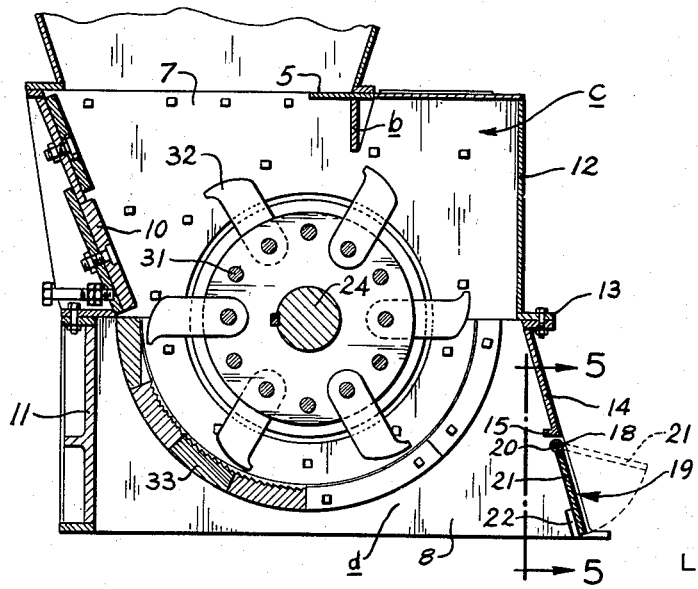
Fig. 4 is a fragmentary sectional view taken along line 4—4 of Fig. 3.

Referring now in more detail and by reference characters to the drawings, which illustrate a preferred embodiment of the present invention, A designates a shredding and crushing plant including a feed conveyor 1, the discharge end of which is supported adjacent the open upper end 2 of a hopper 3. At its lower end 4, the hopper 3 is marginally bolted to the horizontal top wall 5 of an open-bottomed shredder housing 6 and in alignment with an opening 7 formed in the rearward portion of said top wall 5. The housing 6 also includes spaced vertical side walls 8, 9, and a downwardly and forwardly inclined upper back wall section 10 (Fig. 4), and bolted adjacent the lower end of the back wall section 10 is a vertical lower, back wall section 11. Joined to the forward end of the top wall 5 is an upper vertical front wall section 12 which terminates in an outwardly extending flange 13 provided with a downwardly and forwardly inclined lower front wall section 14 formed at its lower end with a short inwardly projecting flange 15. Mounted on and depending from the under face of the top wall 5 is a short transverse baffle $b$ which, together with the top wall 5 and wall section 12, define a square-shouldered chamber $c$ at the top return side of the hammer circle to permit any shredded cane which may cling to the hammers 32 to be flung free and drop down along the inner face of the wall section 12 for discharge with the main body of shredded material. Adjacent the cutter bars 33 the open bottom of the housing forms a downwardly presented discharge passage $d$.

Secured at its opposite ends by nuts 16, 17, and extending between the side walls 8, 9, so as to lie adjacent to and below the flange 15 is a pivot pin 18 for swingably supporting a door-like closure 19, and welded to the under side of the flange 15 are spaced aligned tubular hinge knuckles 20 for receiving the pivot pin 18. At its upper end, the closure 19 is provided with aligned complementary hinge knuckles 20' which fit over and are supported by the pivot pin 18 and welded edgewise to the hinge knuckles 20' is a flat, rectangular closure plate 21, the latter normally resting on a pair of stop members 22, 23, secured to the lower margins of side walls 8, 9. As best seen by reference to Fig. 4, the closure plate 21 is approximately the same length as the inclined lower front wall section 14 and, in effect, substantially forms a continuation thereof.

Extending longitudinally between the side walls 8, 9, somewhat centrally thereof and projecting therethrough is a shaft 24, the latter being journaled in bearings 25, 26, suitably positioned on brackets 27, 28, formed on the side walls 8, 9. Mounted on the shaft 24 is a spacer sleeve 29 for supporting a series of spaced parallel rotor discs 30 and extending longitudinally through the rotor discs 30 are a plurality of rods 31 for securing a series of circumferentially spaced hammers 32 which cooperate with stationary cutter bars 33. It will be understood that the shaft 24 can be driven by any suitable prime mover (not shown).

Mounted below the shredder housing 6 in spaced relationship thereto is an upwardly and forwardly extending endless power driven conveyor 34 including a short downwardly extending run 35 for delivering shredded stalks to a pair of rotatable crushing rolls 36, 37. The conveyor 34 and crushing rolls 36, 37, are conventional and are, therefore, not shown or described in detail. Positioned on each side of the conveyor 34 and extending upwardly therefrom is a pair of spaced parallel side panels 38, 39, which form, with the conveyor 34, a channel 40, and prevents the shredded stalks from falling sidewise off of the conveyor 34. As seen by reference to Figs. 1 and 4, the side panels 38, 39, are located adjacent to and in approximate alignment with the side walls 8, 9, and extend downwardly and forwardly therefrom as well as forwardly of the closure 19 so that the closure plate 21 is capable of swinging outwardly into the channel 40.

In use, the cane stalks are loaded upon the conveyor 1 and fed thereby into the hopper 3. The stalks drop downwardly through the opening 7 into the circle of rotating hammers 32 and are shredded thereby. The shredded material then drops downwardly through the discharge passage d and onto the conveyor 34 which carries it to the crushing rollers 36, 37. If the conveyor 34 does not carry the shredded material away as fast as it is deposited thereon, the shredded material will tend to pile up into the shredder housing 6. However, since the volume of the lower half of the housing 6 is enlarged at its forward end by reason of the forwardly inclined wall section 14 and the closure 19, there will be an additional space which may be occupied, if needed, by the shredded material that would otherwise not be present if the lower front wall were vertical. Furthermore, the pressure created by the shredded material acts on the closure plate 21 forcing it to swing forwardly to the position shown in dotted lines in Fig. 4 and provides an additional passageway through which the shredded material may be discharged into the channel 40. When the pressure within the housing 6 is relieved, the closure plate will swing back under its own weight to the position shown in full lines in Fig. 4.

It should be understood that changes and modifications in the form, construction, arrangement, and combination of the several parts of the shredding machine may be made and substituted for those herein shown and described without departing from the nature and principle of my invention.

Having thus described my invention, what I claim and desire to secure by Letters Patent is:

1. A shredding machine having an intake, a shredding rotor located below the intake, shredding means disposed below the shredding rotor, an open-bottomed shredder housing forming a discharge passageway located below the shredding means and adapted for discharging shredded material in a generally downward direction, a conveyor having a housing including side walls which enclose the space beneath the lower end of the discharge passageway and extend outwardly beyond the passageway at an upwardly inclined angle to the downward direction of discharge of shredded material, said conveyor also including a substantially flat upwardly presented carrier surface extending across the lower end of the discharge passageway and projecting outwardly therefrom through the conveyor housing, said carrier surface emerging from the shredder housing, the interior end of said carrier surface being located so that the vertical distance between the shredding rotor and the carrier surface at its interior end is substantially greater than the distance between the shredding rotor and the carrier surface at the region where the carrier surface emerges from the housing, and a depending flap horizontally pivoted adjacent to the side walls above the region where the carrier surface emerges from the housing, said flap having its lower margin located in upwardly spaced relation to the carrier surface to provide a constantly open discharge mouth, said flap being adapted to swing upwardly and outwardly between the side walls of the conveyor housing to afford additional clearance over the carrier surface whenever the thickness of shredded material is greater than a predetermined amount, said flap also being adapted to swing back downwardly toward its normal depending position whenever such thickness of shredded material is reduced toward or below said predetermined amount whereby to provide an automatically adjustable enlargement for said discharge mouth.

2. A shredding machine as defined in claim 1 and further having stop means adjacent to the junction between the shredder housing and the conveyor housing for limiting the downward swinging movement of the flap.

References Cited in the file of this patent

UNITED STATES PATENTS

| | | |
|---|---|---|
| 297,755 | Case | Apr. 29, 1884 |
| 349,607 | Reeder | Sept. 21, 1886 |
| 906,346 | Williams | Dec. 8, 1908 |
| 1,078,650 | Williams | Nov. 18, 1913 |
| 1,286,831 | Sturtevant | Dec. 3, 1918 |
| 1,606,692 | Brooks | Nov. 9, 1926 |
| 1,643,938 | Addicks | Oct. 4, 1927 |
| 1,808,264 | Shelton | June 2, 1931 |
| 1,947,700 | Elzemeyer | Feb. 20, 1934 |
| 2,478,733 | Wright | Aug. 9, 1949 |
| 2,828,922 | Knight | Apr. 1, 1958 |

FOREIGN PATENTS

| | | |
|---|---|---|
| 208,046 | Great Britain | Dec. 13, 1923 |